Figure 1:
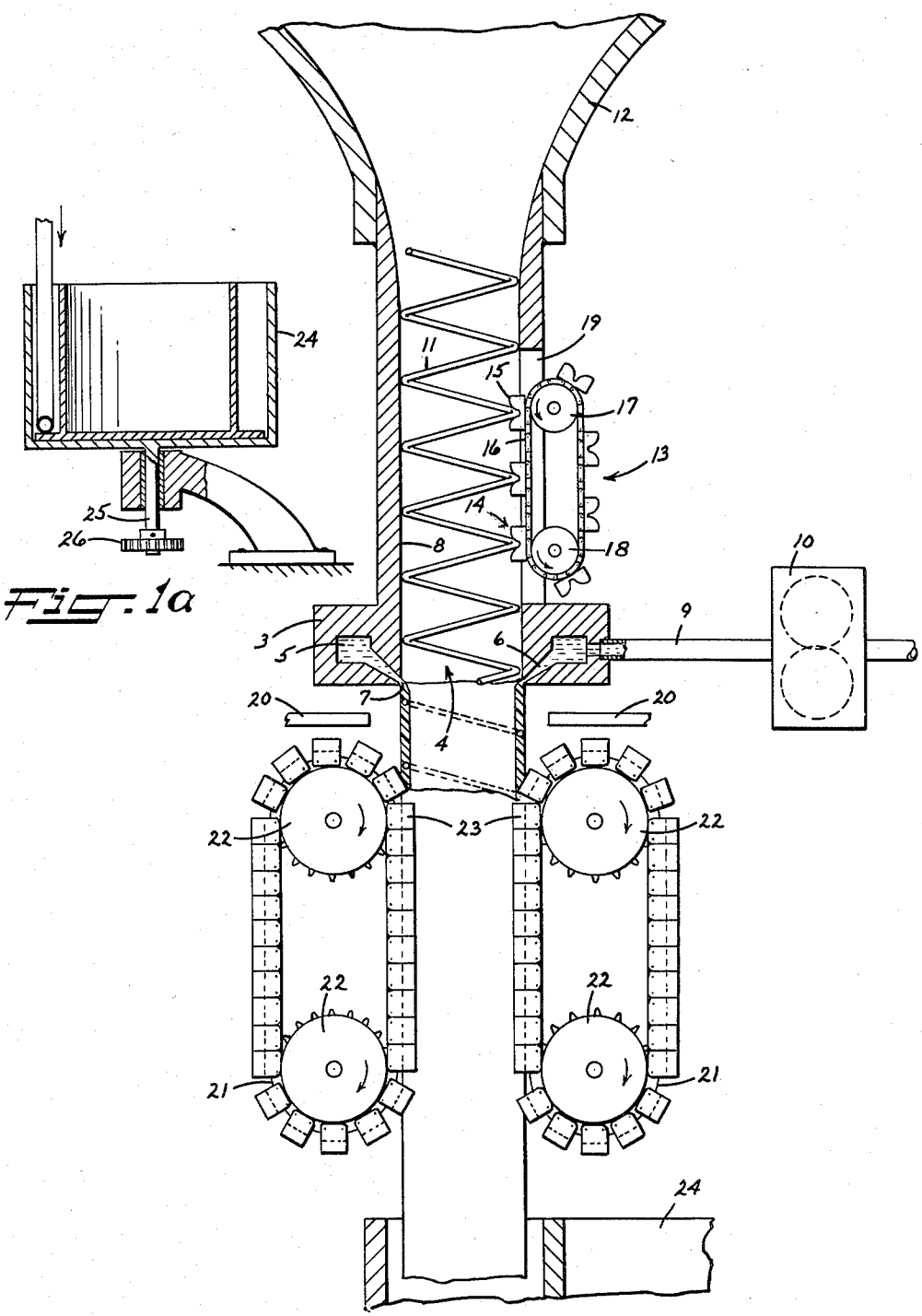

United States Patent Office 2,730,761
Patented Jan. 17, 1956

2,730,761
APPARATUS FOR PRODUCING REINFORCED TUBING

Carl A. Castellan, Delaware County, Pa., assignor to American Viscose Corporation, Philadelphia, Pa., a corporation of Delaware Application April 14, 1953, Serial No. 348,673

3 Claims. (Cl. 18—13)

It is the primary object of this invention to provide an improved apparatus for forming reinforced flexible tubing in a continuous manner. The invention is particularly concerned with the continuous production of reinforced tubing by the continuous feeding in an axial direction of a helically coiled reinforcement, such as of wire or plastic, through a passage in a device for extruding around the reinforcement a plastic material adapted to form the wall of the tube.

In systems heretofore proposed for carrying out this type of procedure, the helically coiled reinforcement is fed to the tubing extrusion orifice by a rotary member having a helical groove within which the reinforcing helix is received. The rotation of the grooved member causes the helical reinforcement to advance axially but because of the sliding friction between the helices of the coil and the grooves in the rotary member, such axial feeding motion is accompanied by a severe twisting moment exerted upon the helix. This twisting action extends from the rotary member into and sometimes beyond the extrusion position and when released further on, such twist tends to distort the wal of plastic material within which the strained or twisted coil was embedded at the point of extrusion.

According to the present invention, means is provided for axially advancing the helical reinforcement without the exertion of a twisting moment upon the coil thereby avoiding the tendency to form a distorted tubular wall in the final product. In general, this is accomplished by providing means for axially advancing the helical reinforcement through its guiding channel or passage by a device which comprises means for substantially positively gripping a convolution of the coil. This gripping means preferably grips the wire or plastic transversely of its cross-section thereby preventing lengthwise sliding motion of the wire or plastic element of the coil relative to the gripping element or elements.

Figure 2:
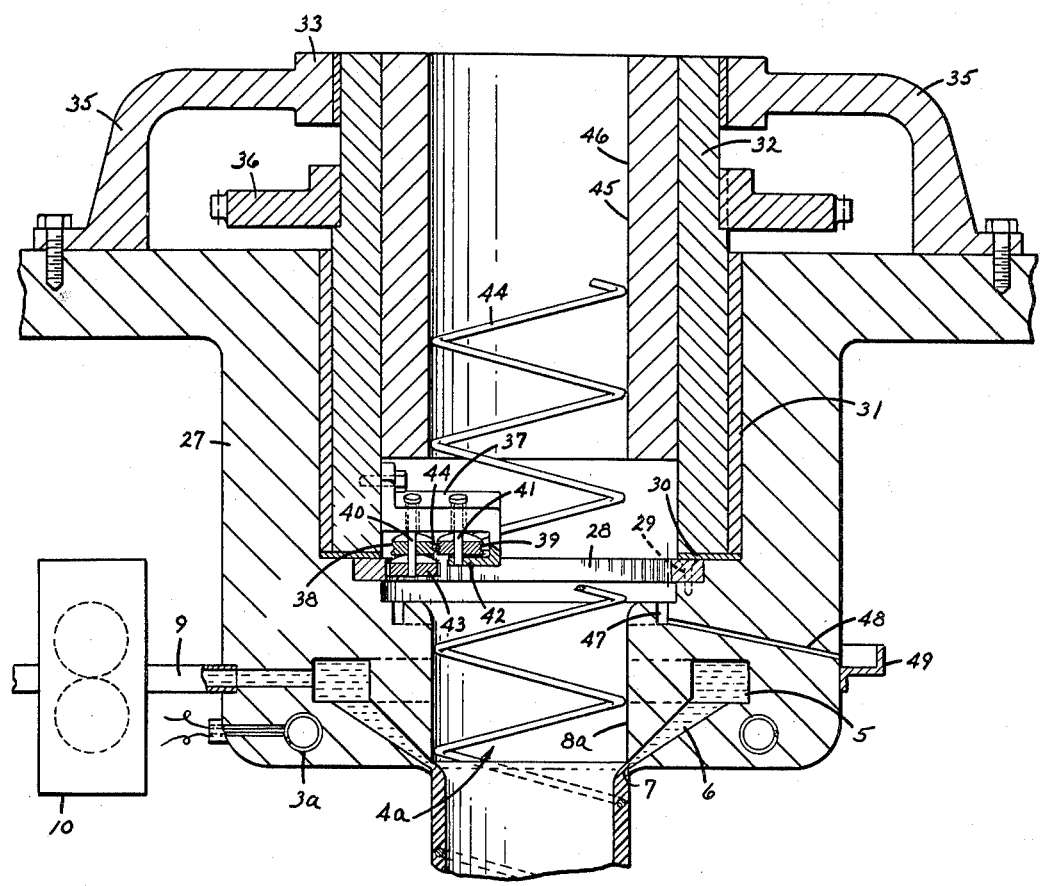

In the drawing, which is illustrative of the invention,

Figure 1 is a sectional elevation showing one embodiment of the present invention, Figure 1a is an enlarged elevation of a receiver, and Figure 2 is a sectional elevation showing another embodiment of the invention.

As shown in Figure 1, there is provided an extrusion head or device 3 having a hollow channel or passageway 4. The extrusion head is provided with an annular chamber 5 having an inwardly and downwardly extending discharge channel 6. The discharge channel 6 terminates in an annular opening 7 in the wall 8 of the channel 4. A plastic tube-forming material may be fed to the chamber 5 by means of a conduit 9 communicating therewith to which a supply of the plastic may be connected through a suitable pump diagramamtically shown at 10. The pump 10 is preferably of a positive displacement type, such as a gear pump, so that the plastic material may be fed to the extrusion device 3 at any desired predetermined constant rate. The extrusion device 3 may be internally heated either by an electric heating coil, or a fluid heating coil such as one that may be supplied with steam or any suitable heat interchange material, such as diphenyl, glycerine, or the like. It may also be provided in conventional fashion with insulation or lagging to reduce the loss of heat to the surrounding atmosphere.

A coiled reinforcement 11 is adapted to be supplied through the channel 4 from a suitable supply thereof supported in a casing or housing 12 above the extrusion head. Means is provided for axially forwarding the reinforcement 11 through the channel 4. As shown, this means designated generally by the reference character 13 comprises one or more gripping systems 14 which positively grip the individual wire or plastic element of the coil 11 at one or more points axially displaced along one side of the coil. Each gripper 14 comprises an indented element 15 secured to an endless chain 16 driven about a pair of sprockets 17 and 18 respectively. The sprockets 17 and 18 are so mounted either on or adjacent the extrusion device as to cause the gripper or grippers 14 to project through a slot 19 extending lengthwise of the wall surrounding the channel 4. When a plurality of grippers 14 are provided on the chain as is the preferable situation shown, they are spaced apart distances such that the distance between their indentations is equal to the pitch of the coil reinforcement. Each element 15 has a smoothly curved and gradually sloped or tapered surface as shown on each side of the indentation so that the wire or plastic element of the coil slides easily into the indentation as the griper swings through the slot 19 into the chamber 4 and first engages the wire or plastic. The sloped faces of the gripper on each side of the indentation taper downwardly to a width slightly narrower than the diameter of the wire or plastic so that when the gripper first becomes fully introduced into the channel 4, it wedges or jambs the wire into the indentation. This gripping action may be facilitated by providing rubber faces on the gripper member as the side walls of the depression or indentation so that the wire is gripped between such faces.

As the helix is fed directly through the channel by the gripper means comprising the gripper members 14, it passes the opening 7 and is embedded in the wall of plastic material extruded therethrough under the force of the pump 10. The reinforced tubing after leaving the extrusion head more or less rapidly sets up and this may in some cases be assisted by the playing upon the tube of jets of cold fluid, such as cold air, proceeding from pipes 20. At a point beyond the extrusion device where the external surface of the tube is sufficiently set or coagulated, it may be engaged by a gripping and feeding device which may comprise a pair of endless belts 21 driven about and by rotors 22 and provided with gripping blocks 23 whose opposed external gripping faces are arcuate concavities complementary in shape to the shape of the tube. The belt systems are supported adjacent the tubing so that the blocks 23 grip the tubing and are advanced by means of the belt systems at the same speed as the speed of advancement of the helical reinforcement by means of the gripping system 13. This tube-advancing means serves to support the tubing and reduce the weight carried by the extruded material and the reinforcement at the extrusion orifice.

The tubing may be collected in a receiver which may (Fig. 1a) consist of a rotating cylindrical vessel 24 carried on a shaft 25 by which it is driven by means of a pulley or other device 26. This embodiment is adapted to produce tubing of cross-section other than round as well as round, it being only necessary to modify the contour of the inside wall 8 and the cross-sectional shape of the coil of reinforcement material. For example, a tube having square, rectangular, oval or triangle shape may be produced, if desired.

The thickness of the wall of the tubing can be varied as desired by increasing or decreasing the speed of pump 10 while maintaining the speed of advance by the belt systems 21 constant. On the other hand, if the pump is maintained at constant speed, the thickness of the material can be increased or decreased by slowing down or speeding up the advancement by belt systems 21 and the gripper device 13.

Because of the positive gripping action exerted by the grippers 14 transversely upon the convolutions of the helix and the strict axial movement of the grippers 14, there is no tendency for the development of a twisting action in the coil thereby avoiding the distortions set up by prior devices when such twisting action releases itself at some point beyond the point of extrusion where the reinforcement is embedded in the plastic material.

In the embodiment of Figure 2, the extrusion device 27 is provided with a similar chamber 5, passage 6, annular orifice 7 terminating in the wall 8a of a channel 4a. A heating element is shown at 3a. The extrusion head 27 is provided with an annular recess, to the bottom of which an annular internal gear 28 is fixedly secured as by screws 29. A thrust bearing or washer 30 is received thereon and a bushing 31 is received above the washer 30. A hollow cylinder or sleeve 32 is rotatably mounted within the bushing 31 and an outboard bearing 33 carried in suitable brackets 35 connected to the extrusion head or supporting frame therefor. A sprocket 36 is secured to the cylindrical member 32 for rotating it. Upon the inside wall of the cylindrical member 32, a bracket or arm 37 is secured and on this bracket a pair of rotors 38 and 39 are mounted on the shafts 40 and 41. As shown, the shaft 41 may extend through an outer arm 42 extending from the bracket 37. The outboard end of shaft 40 carries a gear 43 which is in mesh with the annular gear 28. The rotors 38 and 39 preferably have concavely-curved peripheries adapted to embrace the wire 44. If desired, the peripheries of these rotors may be of rubber to provide better gripping action. An additional sleeve 45 may be secured within the cylinder 32 to provide an internal guiding wall 46 of the same diameter as the wall 8a to serve as a guide for the helical reinforcement proceeding to the gripper device comprising rotors 38 and 39. An annular groove 47 may be provided to catch any oil draining from the ring gear 28 and a bore 48 extending through the extrusion head wall directs such oil to a collecting vessel 49 secured to the outer wall from which it can be readily removed.

This embodiment of the extrusion head may replace the extrusion system in Figure 1, i. e., it may receive the reinforcing coil from a similar supply receptacle thereof and discharge the extruded tube to supporting and advancing systems such as those shown at 21 and into a collecting device as in Figure 1. If needed, coagulating means may also be provided as in Figure 1.

In the operation of the system in Figure 2, the size of gears 28 and 43 are so correlated with respect to the diameter of the driven roll 38 as to cause linear advance of wire 44 by the rolls 38 and 39 a distance equal to the length of one coil of the helix during a single revolution of the member 32. The angle of helix being herein defined as the angle between the tangent to the helix and the generatrix of the cylinder within which the helix is located. In other words, the rotary means 38 and 39 is driven at a rate to feed the element of the helix at a rate substantially equal to the quotient obtained by dividing the rate of rotation of the point of engagement between the element and the rotary means about the axis of the channel by the sine of the helix angle. When so constructed, there is no twisting component imparted to the helix but it is advanced a single pitch of the reinforcement coil during one revolution of the cylindrical member 32 and such advance is strictly uniform and in an axial direction. This strict axial motion results because the axis of shaft 40 lies in a plane which is parallel to the axis of the channel 4 but inclined out of parallel to such axis by an angle complementary to the angle of helix and the rotation of cylinder 32 about the axis of the channel 4a causes the point of gripping between the wire 44 and the nip rolls 38 and 39 to move in a plane that is at right angles to the axis of the channel 4a.

In this embodiment, the gripping means 38 and 39 also positively grips the wire or plastic element of the coil and advances it strictly axially without imparting a twisting motion or moment to the coil proceeding from the extrusion position.

While the devices of Figures 1 and 2 are disposed to discharge the extruded tubing downwardly, they may be disposed to discharge it vertically upwardly or at any inclination to the vertical including a generally horizontal direction. However, the action of gravity favors the dispositions shown and less difficulty is encountered in producing tubing of substantially uniform wall thickness with this arrangement. The system of Figure 1 is adapted to produce practically all sizes and cross-sectional shapes of reinforced tubing that are in demand whereas the system of Figure 2 is adapted to produce the larger sizes of cylindrical reinforced tubing.

The system of the present invention is adapted to produce reinforced tubing in a continuous manner from all sorts of plastic materials, such as vinyl resins, thermosetting resins, elastomeric polymers such as rubber, synthetic rubbers or the like, polyethylene, nylon, cellulose solutions and derivatives, such as solutions of cellulose esters in volatile solvents, including cellulose acetate, also cellulose ethers, such as ethyl cellulose, hydroxyethyl cellulose and carboxymethyl cellulose. The helical reinforcement may be formed of a wire of metallic or plastic material. It is preferably highly resilient so as to allow bending of the final tube when the walls thereof are of a flexible material or elastic material.

It is to be understood that changes and variations may be made without departing from the spirit and scope of the invention as defined in the appended claims.

I claim:

1. Apparatus for producing reinforced tubing comprising an extrusion device comprising a fixed hollow member having an internal wall defining a channel through the device for receiving and guiding a reinforcement element, a discharge orifice extending circumferentially of the wall adjacent one end thereof, an axial slot extending through the internal wall of the member and spaced from the orifice, a gripper member for gripping the element, means for moving the gripper member in a circuitous path extending through the slot in a direction to advance the element axially toward the orifice.

2. Apparatus for producing reinforced tubing comprising an extrusion device comprising a fixed hollow member having an internal wall defining a channel through the device for receiving and guiding a reinforcement element, a discharge orifice extending circumferentially of the wall adjacent one end thereof, an axial slot extending through the internal wall of the member and spaced from the orifice, a gripper member for gripping the element, an endless flexible support to which the gripper member is secured, spaced rotors for driving the support continuously, means for mounting the rotors adjacent the hollow member with the support extending into the slot and the gripper member inside the hollow member where it is adapted to engage the reinforcement element, said driving means being driven to advance the gripper member axially along the slot toward the orifice.

3. Apparatus for producing reinforced tubing comprising an extrusion device comprising a fixed hollow member having an internal wall defining a channel through the device for receiving and guiding a helically coiled reinforcement element, a discharge orifice extending circumferentially of the wall adjacent one end thereof, an axial slot extending through the internal wall of the member and spaced from the orifice, an endless movable support, a plurality of gripper members fixed to the support and spaced apart thereon a distance equal to the pitch distance of the helical reinforcement element, means for driving the support continuously comprising spaced rotors, means for mounting the rotors adjacent the hollow member with the support extending into the slot so that the gripper members enter the hollow member through the slot to positively grip successive coils of the reinforcement element and advance the element continuously toward the orifice.

References Cited in the file of this patent

UNITED STATES PATENTS

| | | |
|---|---|---|
| 786,257 | Beebe | Apr. 4, 1905 |
| 1,211,370 | Price et al. | Jan. 2, 1917 |
| 1,558,018 | Lambert | Oct. 20, 1925 |
| 1,951,176 | Smith | Mar. 13, 1934 |

FOREIGN PATENTS

| | | |
|---|---|---|
| 810,638 | France | Sept. 16, 1936 |